US008856049B2

(12) United States Patent
Vasilache et al.

(10) Patent No.: US 8,856,049 B2
(45) Date of Patent: Oct. 7, 2014

(54) AUDIO SIGNAL CLASSIFICATION BY SHAPE PARAMETER ESTIMATION FOR A PLURALITY OF AUDIO SIGNAL SAMPLES

(75) Inventors: Adriana Vasilache, Tampere (FI); Lasse Juhani Laaksonen, Nokia (FI); Mikko Tapio Tammi, Tampere (FI); Anssi Sakari Ramo, Tampere (FI)

(73) Assignee: Nokia Corporation, Espoo (FI)

( * ) Notice: Subject to any disclaimer, the term of this patent is extended or adjusted under 35 U.S.C. 154(b) by 484 days.

(21) Appl. No.: 12/934,656

(22) PCT Filed: Mar. 26, 2008

(86) PCT No.: PCT/EP2008/053583

§ 371 (c)(1),
(2), (4) Date: Sep. 26, 2010

(87) PCT Pub. No.: WO2009/118044

PCT Pub. Date: Oct. 1, 2009

(65) Prior Publication Data

US 2011/0016077 A1 Jan. 20, 2011

(51) Int. Cl.

| | |
|---|---|
| ***G06F 15/18*** | (2006.01) |
| ***G10L 19/02*** | (2013.01) |
| ***G10L 11/00*** | (2006.01) |
| ***G10L 11/02*** | (2006.01) |
| ***G10L 25/78*** | (2013.01) |
| *G10L 19/22* | (2013.01) |

(52) U.S. Cl.

CPC *G10L 25/78* (2013.01); *G10L 19/22* (2013.01)
USPC ................. 706/12; 706/20; 706/22; 704/205; 704/231; 704/240

(58) Field of Classification Search

USPC ........................................................... 706/52
See application file for complete search history.

(56) References Cited

U.S. PATENT DOCUMENTS 4,725,897 A * 2/1988 Konishi ........................ 386/326

OTHER PUBLICATIONS http://ieeexplore.ieee.org/xpls/abs_all.jsp?arnumber=859069&tag=1 Eronen et al., Musical Instrument Recognition Using Cepstral Coefficients and Temporal Features. [online], 2000 [retrieved on Oct. 22, 2012]. Retrieved from the Internet<URL:http://ieeexplore.ieee.org/xpls/abs_all.jsp?arnumber=859069&tag=1>.*

Molina et al., A practical procedure to estimate the shape parameter in the generalized Gaussian distribution [online], 2001 [retrieved on Apr. 29, 2013]. Retrieved from the Internet<URL:http://www.cimat.mx/reportes/enlinea/l-01-18_eng.pdf>.*

Prasad et al., Estimation of Shape Parameter of GGD Function by Negentropy Matching. [online], 2005 [retrieved on Nov. 9, 2012]. Retrieved from the Internet<URL:http://www.springerlink.com/content/p487x57707215157/>.*

(Continued)

*Primary Examiner* — Jeffrey A Gaffin
*Assistant Examiner* — Nathan Brown, Jr.
(74) *Attorney, Agent, or Firm* — Harrington & Smith

(57) ABSTRACT

An apparatus for classifying an audio signal configured to: estimate at least one shaping parameter value for a plurality of samples of the audio signal; generate at least one audio signal classification value by mapping the at least one shaping parameter value to one of at least two interval estimates; and determine at least one audio signal classification decision based on the at least one audio signal classification value.

24 Claims, 7 Drawing Sheets

(56) References Cited

OTHER PUBLICATIONS

Mallat, S.; "A Theory for Multiresolution Signal Decomposition: The Wavelet Representation"; IEEE Transactions on Pattern Analysis and Machine Intelligence, vol. 11, No. 7; Jul. 7, 1989; pp. 674-693.

Oger, M. et al.; "Low-Complexity Wideband LSF Quantization by Predictive KLT Coding and Generalized Gaussian Modeling"; 14$^{th}$ European Signal Processing Conference (EUSIPCO 2006), Florence, Italy; Sep. 4-8, 2006; whole document (5 pages).

* cited by examiner

AUDIO SIGNAL CLASSIFICATION BY SHAPE PARAMETER ESTIMATION FOR A PLURALITY OF AUDIO SIGNAL SAMPLES

RELATED APPLICATION

This application was originally filed as PCT Application No. PCT/EP2008/053583 filed Mar. 26, 2008, which is incorporated herein by reference in its entirety.

FIELD OF THE INVENTION

The present invention relates to audio signal classification and coding, and in particular, but not exclusively to speech or audio coding.

BACKGROUND OF THE INVENTION

Audio signals, like speech or music, are encoded for example by enabling an efficient transmission or storage of the audio signals.

Audio encoders and decoders are used to represent audio based signals, such as music and background noise. These types of coders typically do not utilise a speech model for the coding process, rather they use processes for representing all types of audio signals, including speech.

Speech encoders and decoders (codecs) are usually optimised for speech signals, and often operate at a fixed bit rate.

An audio codec can also be configured to operate with varying bit rates. At lower bit rates, such an audio codec may work with speech signals at a coding rate equivalent to pure speech codec. At higher bit rates, the audio codec may code any signal including music, background noise and speech, with higher quality and performance.

A further audio coding option is an embedded variable rate speech or audio coding scheme, which is also referred as a layered coding scheme. Embedded variable rate audio or speech coding denotes an audio or speech coding scheme, in which a bit stream resulting from the coding operation is distributed into successive layers. A base or core layer which comprises of primary coded data generated by a core encoder is formed of the binary elements essential for the decoding of the binary stream, and determines a minimum quality of decoding. Subsequent layers make it possible to progressively improve the quality of the signal arising from the decoding operation, where each new layer brings new information. One of the particular features of layered based coding is the possibility offered of intervening at any level whatsoever of the transmission or storage chain, so as to delete a part of binary stream without having to include any particular indication to the decoder.

The decoder uses the binary information that it receives and produces a signal of corresponding quality. For instance International Telecommunications Union Technical (ITU-T) standardisation aims at an embedded variable bit rate codec of 50 to 7000 Hz with bit rates from 8 to 32 kbps. The codec core layer will either work at 8 kbps or 12 kbps, and additional layers with quite small granularity will increase the observed speech and audio quality. The proposed layers will have as a minimum target at least five bit rates of 8, 12, 16, 24 and 32 kbps available from the same embedded bit stream. Further, the codec may optionally operate with higher bit rates and layers to include a super wideband extension mode, in which the frequency band of the codec is extended from 7000 Hz to 14000 Hz. In addition the higher layers may also incorporate a stereo extension mode in which information relating to the stereo image may be encoded and distributed to the bitstream.

By the very nature of layered, or scalable, based coding schemes the structure of the codecs tends to be hierarchical in form, consisting of multiple coding stages. Typically different coding techniques are used for the core (or base) layer and the additional layers. The coding methods used in the additional layers are then used to either code those parts of the signal which have not been coded by previous layers, or to code a residual signal from the previous stage. The residual signal is formed by subtracting a synthetic signal i.e. a signal generated as a result of the previous stage from the original. By adopting this hierarchical approach a combination of coding methods makes it possible to reduce the output to relatively low bit rates but retain sufficient quality, whilst also producing good quality audio reproduction by using higher bit rates.

Some of the foreseen applications for embedded variable bit rate coding and its super wideband and stereo extension technologies include high quality audio conferencing and audio streaming services.

A further enhancement to an audio coder is to incorporate an audio signal classifier in order to characterise the signal. The classifier typically categorises the audio signal in terms of its statistical properties. The output from the classifier may be used to switch the mode of encoding such that the codec is more able to adapt to the input signal characteristics. Alternatively, the output from an audio signal classifier may be used to determine the encoding bit rate of an audio coder. One of the most commonly used audio signal classifiers is a voice activity detector for a cellular speech codec. This classifier is typically used in conjunction with a discontinuous transmission (DTX) system, whereby the classifier is used to detect silence regions in conversational speech.

However in some audio coding systems it is desirable to distinguish between different types of audio signal such as music and speech by deploying an audio signal classifier.

Audio signal classification consists of extracting physical and perceptual features from a sound, and using these features to identify into which of a set of classes the sound is most likely to fit. An audio signal classification system may consist of a number of processing stages, where each stage can comprise one or more relatively complex algorithms. For instance, a typical audio signal classification system may deploy a feature extraction stage which is used to reduce and extract the physical data upon which the classification is to be based. This is usually succeeded by a clustering stage using for example a k-means clustering algorithm in order to determine the mapping of feature values to corresponding categories. Incorporated into most classification systems is a duration analysis stage which is performed over the length of the feature in order to improve the performance of the system. This analysis is usually implemented in the form of a Hidden Markov model.

Therefore a typical audio signal classification system will invariably require a considerable amount of computational processing power in order to effectively operate.

SUMMARY OF THE INVENTION

This invention proceeds from the consideration that as part of an audio coding scheme there is a need to be able to classify the input audio signal in order to instigate a particular mode of operation or coding rate and often the choice of which technology to use during the coding of the signal is made according to the type of signal present. Whilst incorporation of a typical audio signal classifier into the audio coder is possible, it is not always feasible to execute such an algorithm especially within the limited processing capacity of an electronic device such as a hand held computer or mobile communication device.

Embodiments of the present invention aim to address the above problem.

There is provided according to a first aspect of the present invention a method for classifying an audio signal comprising: estimating at least one shaping parameter value for a plurality of samples of the audio signal; generating at least one audio signal classification value by mapping the at least one shaping parameter value to one of at least two interval estimates; and determining at least one audio signal classification decision based on the at least one audio signal classification value.

In embodiments of the invention it is possible to more efficiently classify the type of audio signal to be encoded, and as such it is possible to more efficiently and/or more accurately encode the audio signal based on this classification of the audio signal.

According to an embodiment of the invention determining the at least one audio signal classification decision may further comprise: comparing the at least one audio signal classification value to at least one previous audio signal classification value; and generating the at least one audio signal classification decision dependent at least in part on the result of the comparison.

The at least one audio signal classification decision is preferably updated if the result of the comparison indicates that the at least one audio signal classification value is the same as each of the at least one previous audio signal classification value and the at least one audio signal classification decision is not the same as an immediate proceeding audio signal classification decision.

The at least one audio signal classification decision is preferably updated to be the value of the at least one audio signal classification value.

The at least one previous audio signal classification value is preferably stored in a first in first out memory.

Each of the at least two interval estimates may comprise at least two probability values, wherein each of the at least two probability values is preferably associated with one of at least two distributions of pre-determined shaping parameter values, and wherein each of the at least two distributions of pre determined shaping parameter values may each be associated with a different audio signal type.

Comparing the shaping parameter may further comprise: mapping the estimated shaping parameter to a closest interval estimate; and assigning the audio signal classification value a value representative of an audio signal type, wherein the value representative of the audio signal type is preferably determined according to the greatest of the at least two probability values associated with the closest interval estimate.

Mapping the shaping parameter value may comprise: determining the closest interval estimate to the at least one shaping parameter value, wherein each interval estimate further comprises a classification value; generating the at least one audio signal classification value dependent on the closest interval estimate classification value.

Determining the closest interval estimate may comprise: selecting the interval estimate with a greatest probability value for the shaping parameter value.

Estimating the shaping parameter may comprise: calculating the ratio of a second moment of a normalised audio signal to the first moment of a normalised audio signal.

The normalised audio signal is preferably formed by subtracting a mean value from the audio signal to form a resultant value and dividing the resultant value by a standard deviation value.

The calculation of the standard deviation may comprise: calculating a variance value for at least part of the audio signal; and updating a long term tracking variance with the variance value for the at least part of the audio signal.

The calculation of the mean may comprise: calculating a mean value for at least part of the audio signal; and updating a long term tracking mean with the mean value for the at least part of the audio signal.

The estimated shaping parameter may relate to the shaping parameter of a generalised Gaussian random variable.

The estimated shaping parameter of the shaping parameter of a generalised Gaussian random variable is preferably estimated using a method of estimation derived from a Mallat method of estimation.

The estimated shaping parameter of the shaping parameter of a generalised Gaussian random variable is preferably estimated using a Mallat method of estimation.

The estimated shaping parameter of the shaping parameter of a generalised Gaussian random variable is preferably estimated using a kurtosis value.

The method may further comprise: using the audio signal classification decision to select at least one coding layer from a set of coding layers of an embedded layered audio codec; and distributing coding parameters associated with the at least one coding layer to a bit stream.

The embedded layered audio codec is preferably a multistage embedded layered audio codec, and wherein the at least one coding layer may comprise coding parameters associated with at least a core coding stage of the multistage embedded layered audio codec.

The at least one coding layer may further comprise coding parameters associated with a stereo representation of the audio signal.

The at least one coding layer may further comprise coding parameters associated with bandwidth extended representation of the audio signal.

The audio signal classification decision may further classify the audio signal either as a speech type signal or a music type signal.

According to a second aspect of the present invention there is provided an apparatus for classifying an audio signal configured to: estimate at least one shaping parameter value for a plurality of samples of the audio signal; generate at least one audio signal classification value by mapping the at least one shaping parameter value to one of at least two interval estimates; and determine at least one audio signal classification decision based on the at least one audio signal classification value.

According to an embodiment of the invention the apparatus configured to determine the at least one audio signal classification decision may further be configured to: compare the at least one audio signal classification value to at least one previous audio signal classification value; and generate the at least one audio signal classification decision dependent at least in part on the result of the comparison.

The at least one audio signal classification decision is preferably updated if the result of the comparison indicates that the at least one audio signal classification value is the same as each of the at least one previous audio signal classification value and the at least one audio signal classification decision is not the same as an immediate proceeding audio signal classification decision.

The at least one audio signal classification decision is preferably updated to be the value of the at least one audio signal classification value.

The at least one previous audio signal classification value is preferably stored in a first in first out memory.

The at least two interval estimates may comprise at least two probability values, wherein each of the at least two probability values is preferably associated with one of at least two distributions of pre-determined shaping parameter values, and wherein each of the at least two distributions of pre determined shaping parameter values is each preferably associated with a different audio signal type.

The apparatus configured to compare the shaping parameter may be further configured to: map the estimated shaping parameter to a closest interval estimate; and assign the audio signal classification value a value representative of an audio signal type, wherein the value representative of the audio signal type is preferably determined according to the greatest of the at least two probability values associated with the closest interval estimate.

The apparatus configured to map the shaping parameter value is preferably further configured to: determine the closest interval estimate to the at least one shaping parameter value, wherein each interval estimate may further comprise a classification value; generate the at least one audio signal classification value dependent on the closest interval estimate classification value.

The apparatus configured to determine the closest interval estimate is preferably further configured to: select the interval estimate with a greatest probability value for the shaping parameter value.

The apparatus configured to estimate the shaping parameter is further configured to: calculate the ratio of a second moment of a normalised audio signal to the first moment of a normalised audio signal.

The normalised audio signal is preferably formed by subtracting a mean value from the audio signal to form a resultant value and dividing the resultant value by a standard deviation value.

The apparatus is preferably configured to calculate of the standard deviation by calculating a variance value for at least part of the audio signal and updating a long term tracking variance with the variance value for the at least part of the audio signal.

The apparatus is preferably configured to calculate the mean by calculating a mean value for at least part of the audio signal and updating a long term tracking mean with the mean value for the at least part of the audio signal.

The estimated shaping parameter may relate to the shaping parameter of a generalised Gaussian random variable.

The estimated shaping parameter of the shaping parameter of a generalised Gaussian random variable is preferably estimated using a method of estimation derived from a Mallat method of estimation.

The estimated shaping parameter of the shaping parameter of a generalised Gaussian random variable is preferably estimated using a Mallat method of estimation.

The estimated shaping parameter of the shaping parameter of a generalised Gaussian random variable is preferably estimated using a kurtosis value.

The apparatus may be further configured to: use the audio signal classification decision to select at least one coding layer from a set of coding layers of an embedded layered audio codec; and distribute coding parameters associated with the at least one coding layer to a bit stream.

The embedded layered audio codec is preferably a multistage embedded layered audio codec, and wherein the at least one coding layer may comprise coding parameters associated with at least a core coding stage of the multistage embedded layered audio codec.

The at least one coding layer may further comprise coding parameters associated with a stereo representation of the audio signal.

The at least one coding layer may further comprise coding parameters associated with bandwidth extended representation of the audio signal.

The audio signal classification decision generated by the apparatus may classify the audio signal either as a speech type signal or a music type signal.

An electronic device may comprise an apparatus as described above.

A chip set may comprise an apparatus as described above.

According to a third aspect of the present invention there is provided a computer program product configured to perform a method for classifying an audio signal, comprising: estimating at least one shaping parameter value for a plurality of samples of the audio signal; generating at least one audio signal classification value by mapping the at least one shaping parameter value to one of at least two interval estimates; and determining at least one audio signal classification decision based on the at least one audio signal classification value.

BRIEF DESCRIPTION OF DRAWINGS

For better understanding of the present invention, reference will now be made by way of example to the accompanying drawings in which.

DESCRIPTION OF PREFERRED EMBODIMENTS OF THE INVENTION

Figure 1:
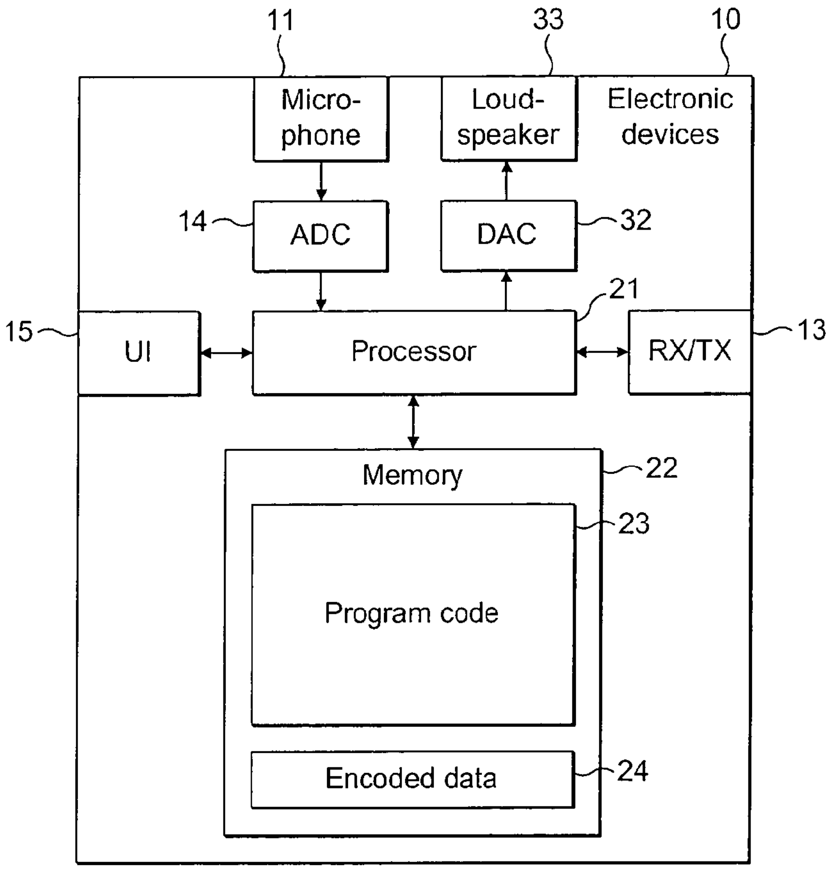
FIG. 1 shows schematically an electronic device employing embodiments of the invention.

The following describes in more detail possible mechanisms for the provision of an efficient audio classifier for an audio codec. In this regard reference is first made to FIG. 1 schematic block diagram of an exemplary electronic device 10, which may incorporate a codec according to an embodiment of the invention.

The electronic device 10 may for example be a mobile terminal or user equipment of a wireless communication system.

The electronic device 10 comprises a microphone 11, which is linked via an analogue-to-digital converter 14 to a processor 21. The processor 21 is further linked via a digital-to-analogue converter 32 to loudspeakers 33. The processor 21 is further linked to a transceiver (TX/RX) 13, to a user interface (UI) 15 and to a memory 22.

The processor 21 may be configured to execute various program codes. The implemented program codes comprise an audio encoding code for encoding a lower frequency band of an audio signal and a higher frequency band of an audio signal. The implemented program codes 23 further comprise an audio decoding code. The implemented program codes 23 may be stored for example in the memory 22 for retrieval by the processor 21 whenever needed. The memory 22 could further provide a section 24 for storing data, for example data that has been encoded in accordance with the invention.

The encoding and decoding code may in embodiments of the invention be implemented in hardware or firmware.

The user interface 15 enables a user to input commands to the electronic device 10, for example via a keypad, and/or to obtain information from the electronic device 10, for example via a display. The transceiver 13 enables a communication with other electronic devices, for example via a wireless communication network.

It is to be understood again that the structure of the electronic device 10 could be supplemented and varied in many ways.

A user of the electronic device 10 may use the microphone 11 for inputting speech that is to be transmitted to some other electronic device or that is to be stored in the data section 24 of the memory 22. A corresponding application has been activated to this end by the user via the user interface 15. This application, which may be run by the processor 21, causes the processor 21 to execute the encoding code stored in the memory 22.

The analogue-to-digital converter 14 converts the input analogue audio signal into a digital audio signal and provides the digital audio signal to the processor 21.

The processor 21 may then process the digital audio signal in the same way as described with reference to FIGS. 2 and 3.

The resulting bit stream is provided to the transceiver 13 for transmission to another electronic device. Alternatively, the coded data could be stored in the data section 24 of the memory 22, for instance for a later transmission or for a later presentation by the same electronic device 10.

The electronic device 10 could also receive a bit stream with correspondingly encoded data from another electronic device via its transceiver 13. In this case, the processor 21 may execute the decoding program code stored in the memory 22. The processor 21 decodes the received data, and provides the decoded data to the digital-to-analogue converter 32. The digital-to-analogue converter 32 converts the digital decoded data into analogue audio data and outputs them via the loudspeakers 33. Execution of the decoding program code could be triggered as well by an application that has been called by the user via the user interface 15.

The received encoded data could also be stored instead of an immediate presentation via the loudspeakers 33 in the data section 24 of the memory 22, for instance for enabling a later presentation or a forwarding to still another electronic device.

Figure 2:
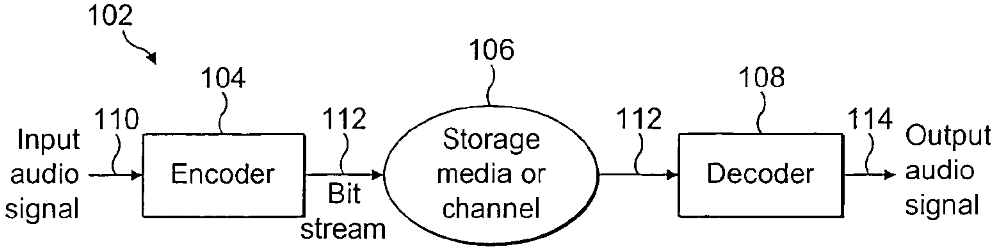
FIG. 2 shows schematically an audio codec system employing embodiments of the present invention.
Figure 3:
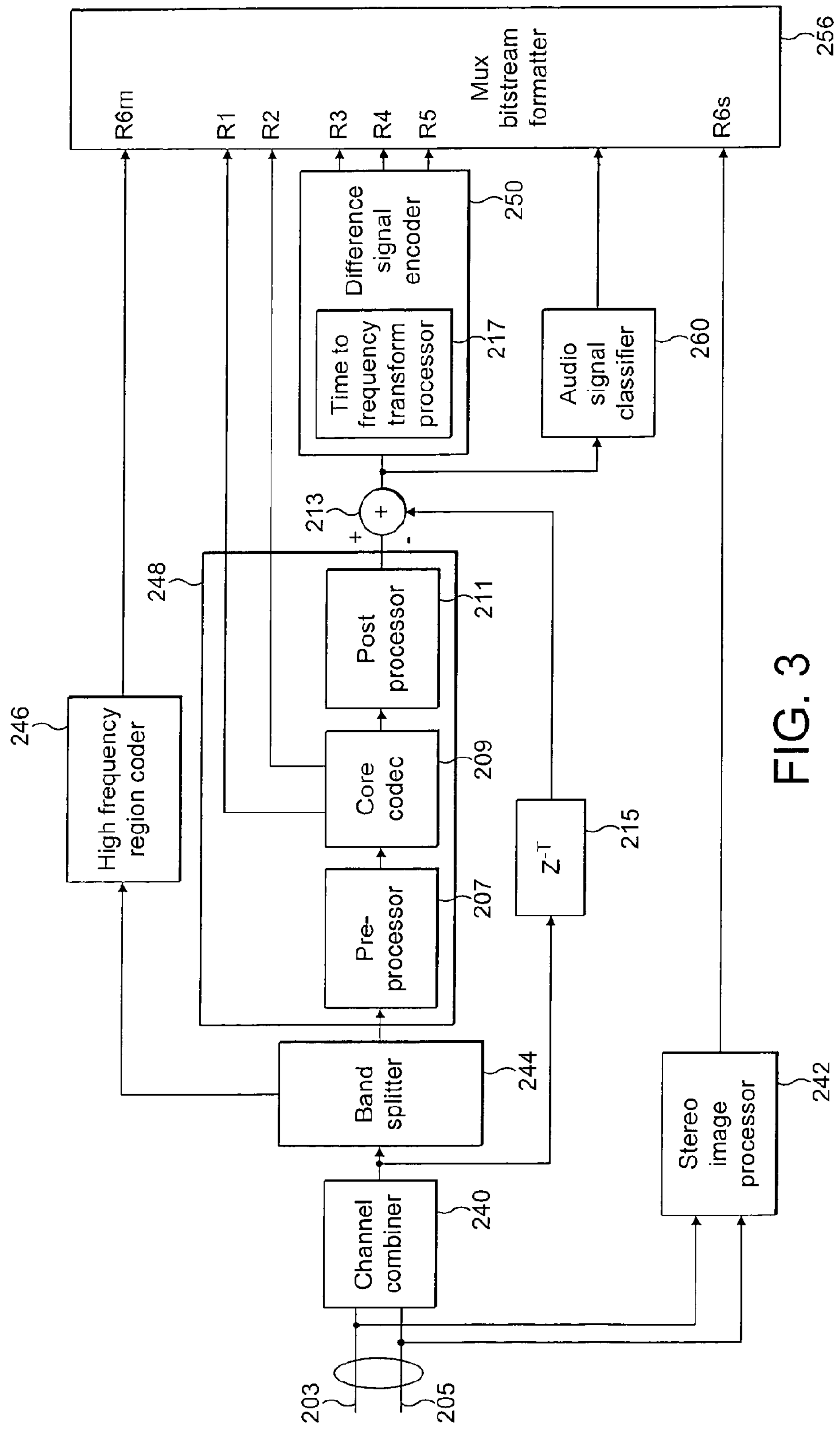
FIG. 3 shows schematically an audio encoder deploying a first embodiment of the invention.
Figure 4:
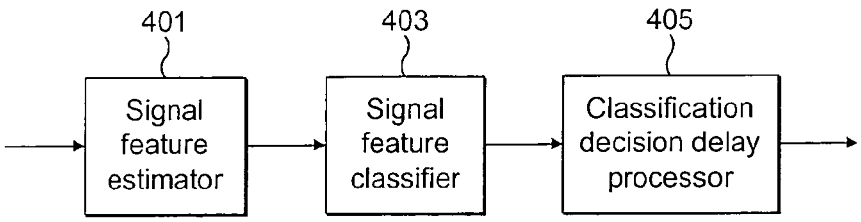
FIG. 4 shows schematically an audio signal classifier according to embodiments of the invention.
Figure 5:
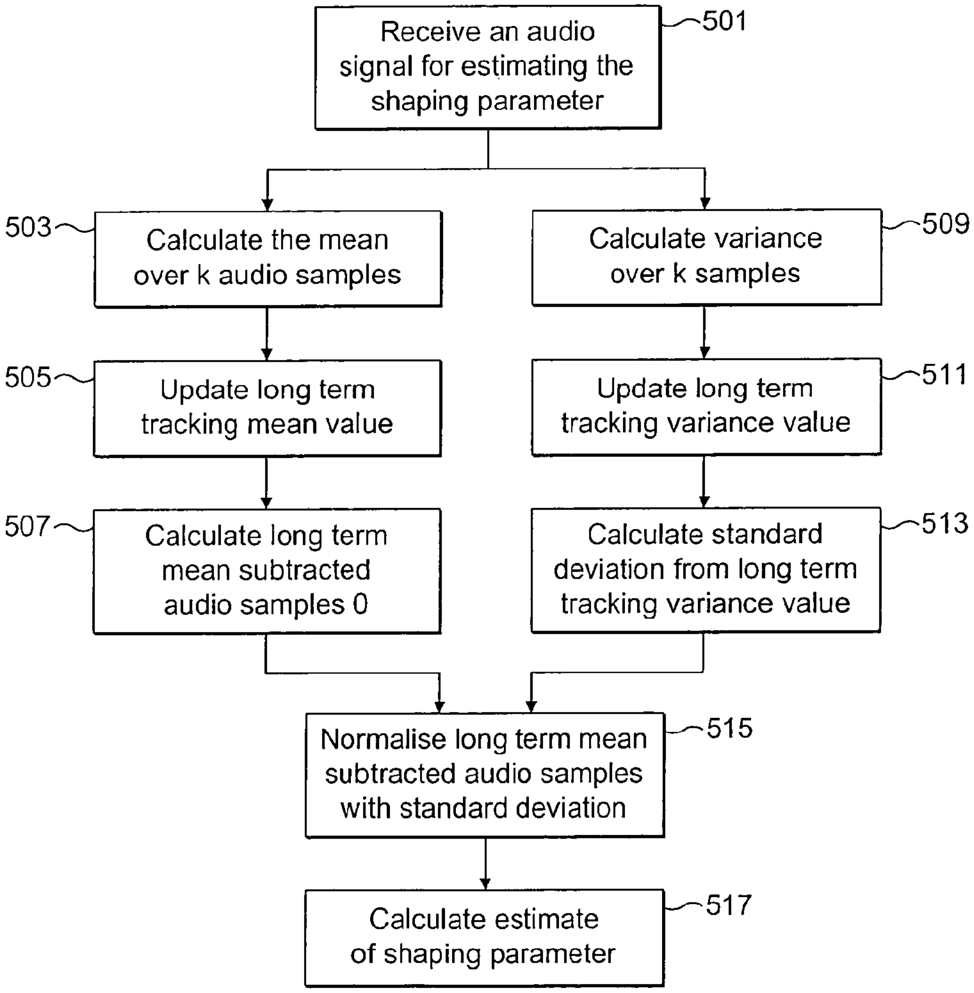
FIG. 5 shows a flow diagram illustrating in further detail a part of the operation of an embodiment of the audio signal classifier as shown in FIG. 4 according to the present invention.
Figure 8:
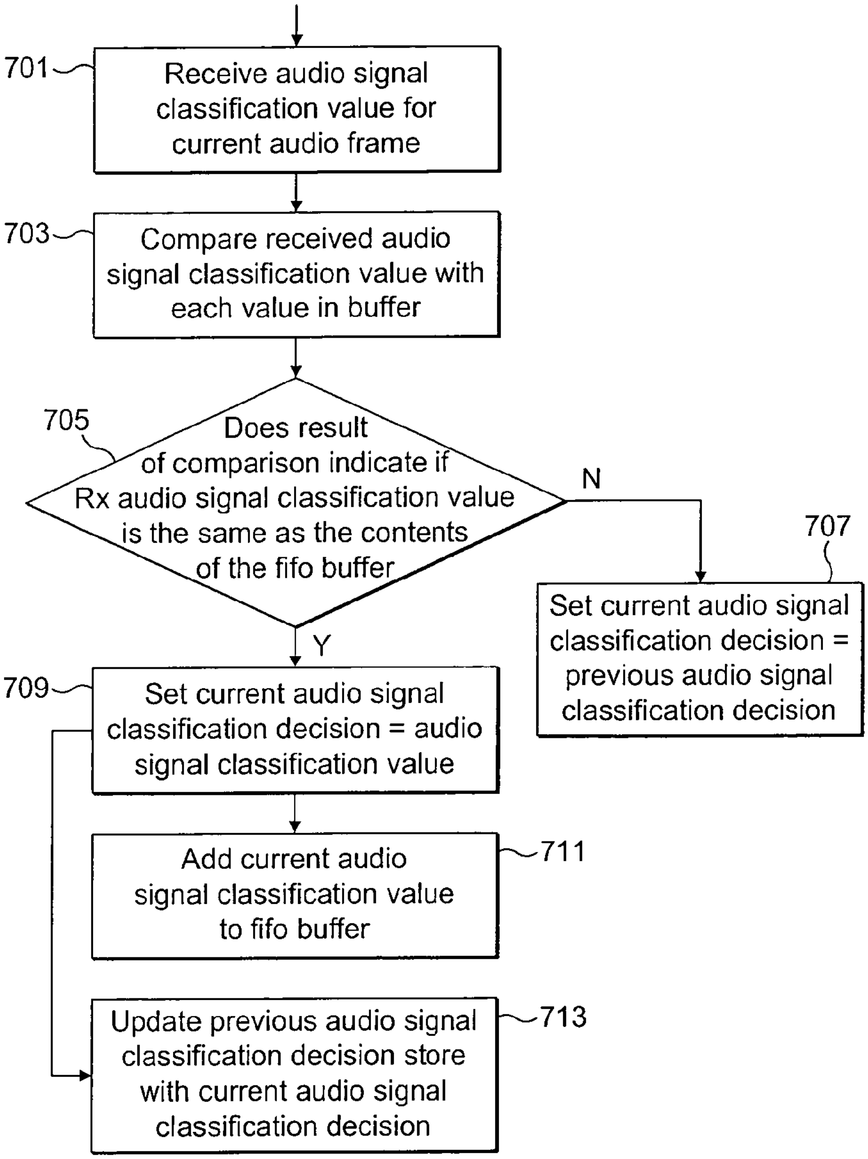
FIG. 8 shows a flow diagram illustrating in further detail a further part of the operation of an embodiment of the audio signal classifier as shown in FIG. 4 according to the present invention.
Figure 10:
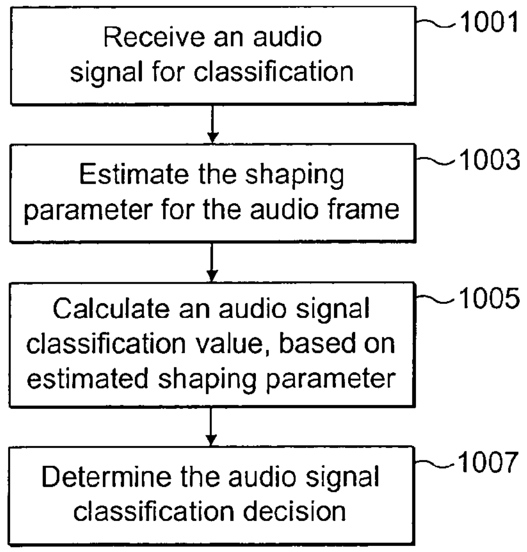
FIG. 10 shows a flow diagram illustrating the operation of an embodiment of the audio signal classifier as shown in FIG. 4.

It would be appreciated that the schematic structures described in FIGS. 2 to 4 and the method steps in FIGS. 5, 8 and 10 represent only a part of the operation of a complete audio codec comprising an audio classifier as exemplarily shown implemented in the electronic device shown in FIG. 1.

The general operation of audio codecs as employed by embodiments of the invention is shown in FIG. 2. General audio coding/decoding systems consist of an encoder and a decoder, as illustrated schematically in FIG. 2. Illustrated is a system 102 with an encoder 104, a storage or media channel 106 and a decoder 108.

The encoder 104 compresses an input audio signal 110 producing a bit stream 112, which is either stored or transmitted through a media channel 106. The bit stream 112 can be received within the decoder 108. The decoder 108 decompresses the bit stream 112 and produces an output audio signal 114. The bit rate of the bit stream 112 and the quality of the output audio signal 114 in relation to the input signal 110 are the main features, which define the performance of the coding system 102.

FIG. 3 shows schematically an encoder 104 according to a first embodiment of the invention. The encoder 104 is depicted as comprising a pair of inputs 203 and 205 which are arranged to receive an audio signal of two channels. It is to be understood that further embodiments of the present invention may be arranged such that the encoder 104 comprises a single channel mono input. Further still, embodiments of the invention may be arranged to receive more than two channels such as the collection of channels associated with a 5.1 surround sound audio configuration.

In a first embodiment of the invention the input channels 203 and 205 are connected to a channel combiner 240, which combines the inputs into a single channel signal. However, further embodiments of the present invention which may be configured to receive a single channel input may not have a channel combiner.

The channel inputs 203 and 205 may also be each additionally connected to a stereo image processor 242. The stereo image processor 242 may convert the two input signals 203 and 205 into frequency domain representations which may comprise groups or sub bands of frequency domain coefficient values and perform a stereo image analysis on the frequency coefficients. The stereo image analysis may be performed on a per sub band basis over the range of frequency coefficients within the sub band. The stereo image analysis process may result in generating energy level factor and stereo image positional information for each sub band. The energy factors and stereo image positional information derived from the stereo image analysis may be quantised and encapsulated as a higher layer coding bit stream within a hierarchical layered coding structure. The bit stream associated with this layer may then be connected to an input of the bit stream formatter/multiplexer 256. This higher layer is depicted as the bit stream R6*s* in FIG. 3. It is to be understood that in further embodiments of the invention which are arranged to encode a single channel, the stereo image processor 242 and its output parameter bit stream, depicted in FIG. 3 as the higher layer R6*s* bit stream, may not be present. In further embodiments of the invention where more than one channel input is received by the encoder 104 the stereo image processor 242 may be replaced by a multi channel image processor.

The output of the channel combiner 240 may be connected to a band splitter 244, which divides the signal into an upper frequency band (also known as a higher frequency region) and a lower frequency band also known as a lower frequency region). For example if the input signal to the bland splitter 244 was originally sampled at 32 kHz, the two split band signals may each have a sampling frequency of 16 kHz. The high frequency band output from the band splitter 244 may be arranged to be connected to a high frequency region coder 246. In a first embodiment of the present invention this high frequency band signal may be encoded with a spectral band replication type algorithm, where spectral information extracted from the coding of the lower frequency band is used to replicate the higher frequency band spectral structure. The output parameters of the high frequency region coder 246 may be quantised and encapsulated into the higher coding layer R6*m* of a hierarchical layered coding structure. The bit stream associated with this layer may then be connected to an input of the multiplexer/bit stream formatter 256.

In a second embodiment of the present invention this higher frequency band signal may be encoded with a higher frequency region coder that may solely act on the higher frequency band signal to be encoded and does not utilise information from the lower band to assist in the coding process. In further embodiments of the invention, there may be no requirement or need to perform band width expansion on the input audio signal. In these embodiments of the invention the codec may be arranged to operate without the functional elements 246 and 244.

The core encoder 248, receives the audio signal to be encoded and outputs the encoded parameters which represent the core level encoded signal, and also the synthesised audio signal (in other words the audio signal is encoded into parameters and then the parameters are decoded using the reciprocal process to produce the synthesised audio signal). In embodiments of the invention as depicted in FIG. 3 the core encoder 248 may be divided into three parts (the pre-processor 207, core codec 209 and post-processor 211).

In the embodiment of the invention shown in FIG. 3, the core encoder receives the audio input at the pre-processing stage 207. The pre-processing stage 207 may perform a low pass filter followed by decimation in order to reduce the number of samples being coded. For example, if the input signal was originally sampled at 16 kHz, the signal may be down sampled to 8 kHz using a linear phase finite impulse response (FIR) filter with a 3 decibel cut off around 3.6 kHz and then decimating the number of samples by a factor of 2. The pre-processing element 207 outputs a pre-processed audio input signal to the core codec 209. Further embodiments may include core codecs operating at different sampling frequencies. For instance some core codecs can operate at the original sampling frequency of the input audio signal.

The core codec 209 receives the signal and may use any appropriate encoding technique. In the embodiment of the present invention shown in FIG. 3 the core codec is an algebraic excited linear prediction encoder (ACELP) which is configured to generate a bitstream, of typical ACELP parameters as lower level signals R1 and R2. The output parameter bit stream from the core codec 209 may be connected to the multiplexer/bit stream formatter 256.

If CELP is used, the encoder output bit stream may include typical ACELP encoder parameters. Non-limiting examples of these parameters include LPC (Linear prediction calculation) parameters quantised in LSP (Line Spectral Pair) or ISP (Immittance Spectral Pair) domain describing the spectral content, LTP (long term prediction) parameters describing the periodic structure within the audio signal, ACELP excitation parameters describing the residual signal after linear predictors, and signal gain parameters.

The core codec 209 may, in some embodiments of the present invention, comprise a configured two-stage cascade code excited linear prediction (CELP) coder producing R1 and/or R2 bitstreams at 8 kbit/s and/or 12 kbit/s respectively. In some embodiments of the invention it is possible to have a single speech coding stage, such as G729—defined by the ITU-T standardisation body. It is to be understood that embodiments of the present invention could equally use any audio or speech based codec to represent the core layer.

The core codec 209 furthermore outputs a synthesised audio signal (in order words the audio signal is first encoded into parameters such as those described above and then decoded back into an audio signal within the same core codec). This synthesised signal is passed to the post-processing unit 211. It is to be appreciated that the synthesised signal is different from the signal input to the core codec as the parameters are approximations to the correct values—the differences are because of the modelling errors and quantisation of the parameters.

The post-processor 211 may re-sample the synthesised audio output in order that the output of the post-processor has a sample rate equal to that of the original input audio signal. For example, if the original input signal was sampled at 16 kHz and the core codec 209 coded the pre processed input signal at a rate of 8 kHz, then the post processor 211 may first up sample the synthetic signal to 16 kHz and then apply low pass filtering to prevent the occurrence of aliasing.

The post-processor 211 outputs the re-sampled signal to the difference unit 213.

In further embodiments of the invention the pre-processor 207 and post processor 211 are optional elements and the core codec may receive and encode the digitally sampled input.

In still further embodiments of the invention the core encoder 248 receives an analogue or pulse width modulated signal directly and performs the parameterization of the audio signal outputting a synthesized signal to the difference unit 213.

The original audio input is also passed to the delay unit 215, which performs a digital delay equal to the delay produced by the core encoder 248 in producing a synthesized signal, and then outputs the signal to the difference unit 213 so that the sample output by the delay unit 215 to the difference unit 213 is the same indexed sample as the synthesized signal output from the core encoder 248 to the difference unit 213. Thereby achieving a state of time alignment between the original audio input signal and the synthesised output signal from the core encoder 248.

The difference unit 213 calculates the difference between the input audio signal, which has been delayed by the delay unit 207, and the synthesised signal output from the core encoder 271. The difference unit outputs the difference signal to the difference signal encoder 250.

The difference signal encoder 250 may receive the difference signal from the output of the difference unit 213. In some embodiments of the present invention the difference encoder 250 may comprise a front end time to frequency transform processor 217 thereby allowing the coding of the difference signal to be performed in the frequency domain. A frequency domain approach may transform the signal from the time domain to the frequency domain using a unitary orthogonal transform such as a modified discrete cosine transform (MDCT).

The modified discrete cosine transform time to frequency processor 217 receives the difference signal and performs a modified discrete cosine transform (MDCT) on the signal. The transform is designed to be performed on consecutive blocks of a larger dataset, where subsequent blocks are overlapped so that the last half of one block coincides with the first half of the next block. This overlapping, in addition to the energy-compaction qualities of the DCT, makes the MDCT especially attractive for signal compression applications, since it can remove time aliasing components which is a result of the finite windowing process.

It is to be understood that further embodiments may equally generate the difference signal within a frequency domain. For instance, the original signal and the core codec synthetic signal can be transformed into the frequency domain. The difference signal can then be generated by subtracting corresponding frequency coefficients.

The difference coder may encode the frequency components of the difference signal as a sequence of higher coding layers, where each layer may encode the signal at a progressively higher bit rate and quality level. In FIG. 3, this is depicted by the encoding layers R3, R4 and/or R5. It is to be understood that further embodiments may adopt differing number of encoding layers, thereby achieving a different level of granularity in terms of both bit rate and audio quality.

The difference encoder 250 may group the frequency coefficients into a number of sub-bands according to a psychacoustic model.

The difference encoder 250 may then be further arranged to code and quantise the spectral coefficient values.

In some embodiments of the invention this may take the form of scaling the coefficients within each band. This may be achieved by a normalisation process whereby the coefficients may be normalised to an energy factor which may be derived from the energy within the sub band. Further embodiments may deploy a normalisation process dependent on a global energy factor derived from the energy of the spectrum. Further still, some embodiments may derive a sub band normalisation factor from the spectrum of the synthetic coded signal as generated by the core codec 209.

The difference coder may then furthermore perform quantisation of the scaled coefficients. The quantisation of the coefficients may use any one of a number of techniques known in the art, including inter alia, vector quantisation, scalar quantisation and lattice quantisation.

The difference coder 250 may then pass the indexed quantised coefficient values, and any other quantised values associated with the coding of the difference signal spectrum to the multiplexer/bit stream formatter 256. These values may form the higher level signals R3, R4 and R5 within the hierarchical structure of the multilayered codec.

The multiplexer/bit stream formatter 256 merges the R1 and/or R2 bit streams with the higher level signals R3, R4 and R5 generated from the difference encoder 250. In addition the multiplexer/bit stream formatter 256 may also merge the high level signals R6*m* and R6*s* which may be associated with data pertaining to super wideband extension and stereo image data respectively.

In addition to merging all the various signals from the different layers, the multiplexer/bit stream formatter 256 may also format the bit streams associated with each of the layers to produce a single bit stream output. The multiplexer/bit stream formatter 256 in some embodiments of the invention may interleave the received inputs and may generate error detecting and error correcting codes to be inserted into the bit stream output 112.

The output from the difference unit 213 may also be connected to the input of the audio signal classifier 260.

In general classification of different regions of an audio signal may be due to each region exhibiting a distinguishing statistical property. For example, a silenced region of an audio signal may have a different statistical property to that of a music region.

The statistical property of an audio signal may be expressed in terms of the probability density function (PDF) of a generalised Gaussian random variable. Associated with a PDF of a generalised Gaussian random variable is a shaping parameter which describes the exponential rate of decay and the tail of the density function. The shaping parameter and the PDF of a generalised Gaussian random variable may be related by the following expression:

$$g_\alpha(z) = \frac{A(\alpha)}{\sigma} e^{-\left|B(\alpha)\frac{z}{\sigma}\right|^\alpha}$$

Where α is a shape parameter describing the exponential rate of decay and the tail of the PDF. The parameters A(α) and B(α), which are functions of the shaping parameter, are given by:

$$A(\alpha) = \frac{\alpha B(\alpha)}{2\Gamma(1/\alpha)} \text{ and } B(\alpha) = \sqrt{\frac{\Gamma(3/\alpha)}{\Gamma(1/\alpha)}}$$

Where Γ(.) is the Gamma function which maybe defined as:

$$\Gamma(\alpha)=\int_0^\infty e^{-t} t^{\alpha+1} dt$$

Figure 6:
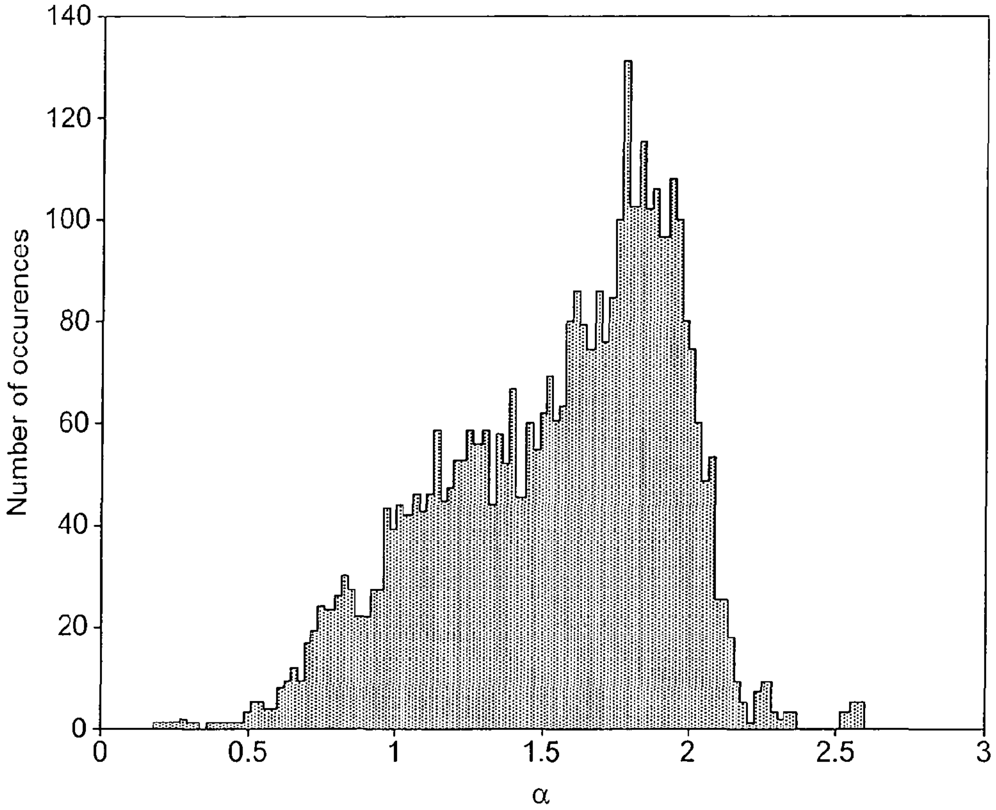
FIG. 6 shows an example of a histogram illustrating the distribution of estimated shaping parameters as employed in embodiments of the invention.
Figure 7:
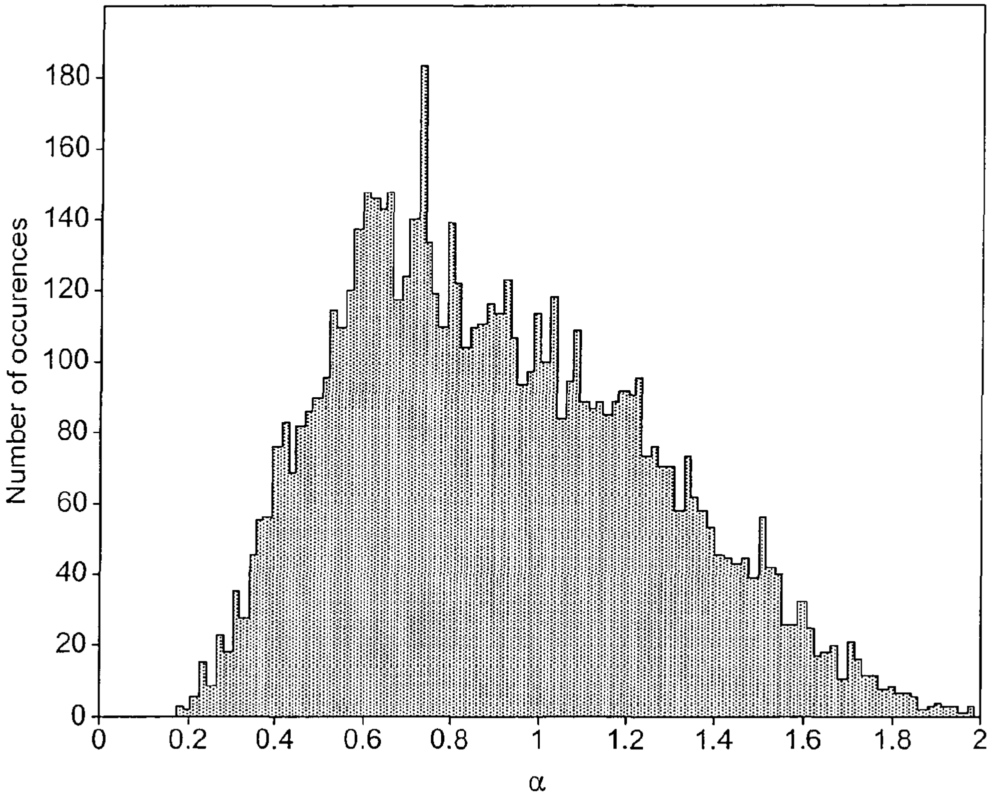
FIG. 7 shows a further example of a histogram illustration the distribution of estimated shaping parameters as employed in embodiments of the invention.

It is to be understood that the values exhibited by the shaping parameters associated with the general Gaussian distribution may change in accordance with the statistical properties of the audio signal, and the distribution of shaping parameter values may be used as a basis for classifying the audio signal. For example, FIG. 6 depicts the shaping parameter histogram for an audio signal which has been pre classified as music, and FIG. 7 depicts the shaping parameter histogram for an audio signal which has been pre classified as speech. From these two examples it may be seen that the statistical distribution of the shaping parameter may vary according to the statistical characteristics of the audio signal.

It is to be noted that the aforementioned distributions may be obtained by accumulating the relative frequency, or the number of occurrences, for each shaping parameter value over training sample base of pre categorized shape factors.

It is to be understood, therefore, that the distribution of sample values of the shaping parameter associated with a generalised Gaussian random variable may be used to classify and identify different types of audio signal.

The audio signal classifier 260 is described in more detail with reference to FIG. 4 depicting schematically the audio signal classifier and with reference to the flow chart in FIG. 10 showing the operation of the audio signal classifier.

The input to the audio signal classifier 260 is connected to the signal feature estimator 401. The signal feature estimator may extract those features from the input audio signal which are to be used for the estimation of the shaping parameter associated with the generalised Gaussian random variable.

The receiving of an audio signal for classification is shown as processing step 1001 in FIG. 10.

The shaping parameter may be estimated by using a method such as the one proposed by Mallat in the publication “A theory for multi resolution signal decomposition: The wavelet representation” first printed in the July 1989 edition of the IEEE Transaction on Pattern Analysis and Machine Intelligence. The method proposes estimating the shaping parameter α of a generalised Gaussian distribution by exploiting the relationship between the variance $E(w^2)$ and the mean of the absolute values $E(|w|)$ of a signal. Mallat proposes that the relation between the variance and the absolute mean of the signal may be given by:

$$\frac{E(|w|)}{\sqrt{E(w^2)}} = F(\alpha).$$

That is a function F(α) of the shaping parameter α, is dependent on the ratio of the variance to the mean of the absolute values of a signal. The function F(α) can be expressed in terms comprising the gamma function of the shaping parameter.

$$F(\alpha) = \frac{\Gamma(2/\alpha)}{\sqrt{\Gamma(1/\alpha)\Gamma(3/\alpha)}}$$

Where E[ ] denotes the expected value of a parameter, w represents the signal upon which the shaping parameter associated with a general Gaussian random variable is to be found. In embodiments of the invention the signal w may represent an audio signal or be derived from an audio signal. Mallat, further proposes using the above expression as a basis for estimating the shaping parameter according to the following expression $$\hat{\alpha} = F^{-1}\left(\frac{\hat{m}_1}{\sqrt{\hat{m}_2}}\right)$$

Where $\hat{m}_1 = 1/n\sum_{i=1}^{n} w_i^2$ and $\hat{m}_2 = 1/n\sum_{i=1}^{n} |w_i|$, n represents the number of samples over which the shaping parameter is estimated, and $w_i$ represents a sample instant of the signal w.

In a first embodiment of the invention the shaping parameter α may be further estimated by calculating a value which relates to the ratio of the expected value of the second moment to the expected value of the first moment of the input audio signal. The audio signal used to calculate the estimation of the shaping parameter may be normalised using the standard deviation and the mean of the signal itself. For the estimation of the shaping parameter the following general expression is evaluated:

$$\frac{E[y^2]}{E[|y|]},$$

where generally the normalised sample may be expressed as $$y_i = \frac{x_i - \mu}{\sigma}$$

The term y is a vector representing the normalised audio signal, and a component of the vector $y_i$ represents a normalised audio signal sample. The term $x_i$ represents a sample of the audio signal to be classified.

The value obtained from the previous expression has the functionality of the shaping parameter value in the classification procedure described later on, and it will be denoted as a derived shaping parameter.

It is to be noted from the above expression that each audio sample $x_i$ may be normalised to both the mean and standard deviation of the signal. This may be achieved by subtracting a value representing the mean μ, for the audio signal, from each sample $x_i$, and then normalising the resultant difference to the standard deviation σ.

The operation of the signal feature estimator 401 will hereafter be described in more detail in conjunction with the flow chart of FIG. 5.

Initially the audio signal is received for estimating the shaping parameter. This is depicted in FIG. 5 as processing step 501.

In the first embodiment of the invention the mean value which is used to normalise the absolute sample values of the audio signal may be obtained by determining a long term tracking mean value which is updated periodically. The long term tracking mean value may then be used to normalise samples of the audio signal.

An update, after k audio signal samples, to the long term tracking mean may be performed according to the following expression:

$$\mu_{m+k} = \left(\mu_m + \frac{1}{m}\sum_{i=m+1}^{m+k} x_i\right)\frac{m}{m+k}$$

Where $\mu_m$ in the above expression is the previous estimate of the long term tracking mean for the audio signal over the accumulated m samples. The term $\mu_{m+k}$ denotes the updated long term tracking mean at m+k samples, and the variable $x_i$ in the above expression denotes the audio sample value at the time index i.

A practical implementation of the updating process for the long term tracking mean may comprise first calculating a mean value over the k samples of the audio signal, and then updating the long term tracking mean using the above expression.

Furthermore, the above expression may be recursive in nature, so that the long term tracking mean $\mu_m$ is updated every k samples according to the expression for $\mu_{m+k}$, described above. Therefore, after every k samples the new value of the long term tracking mean may be determined as $\mu_{m+k}$. The new value of the long term tracking mean may be used as the base long term tracking mean value in the next determination and the audio samples m may also be updated before the next iteration. This may take the form of adding the value k to the accumulated number of audio samples m. The recursive loop may then be repeated for the next k samples of the audio signal.

The process of calculating the mean for a current frame of k samples and then updating the long term tracking mean are shown as processing steps 503 and 505 in FIG. 5.

Similarly, in the first embodiment of the invention the variance value used to normalise the audio signal may also be obtained by maintaining a long term tracking variance value which is updated periodically. The long term tracking variance value may then be used to normalise samples of the audio signal.

An update, after k audio signal samples, to the long term tracking variance may be performed according to the following expression:

$$\sigma^2_{m+k} =$$

-continued $$\frac{m-1}{m-1+k}\sigma_m^2 - \frac{mk^2}{(m+k-1)(m+k)^2}\mu_m^2 - \frac{2mk\mu_m}{(m+k-1)(m+k)^2}\sum_{i=m+1}^{m+k} x_i + \frac{m}{(m+k-1)(m+k)^2}\left(\sum_{i=m+1}^{m+k} x_i\right)^2 + \frac{1}{m+k-1}\sum_{i=m+1}^{m+k}(x_i-\mu_{m+k})^2$$

Where $\sigma^2_m$ in the above expression is the previous estimate for the long term tracking variance of the audio signal over the accumulated m samples. It is to be understood that m is the accumulated total of a series of k sample updates. The terms $\mu_m$ and $\mu_{m+k}$ refer to the previous estimate and the updated estimate of the long term tracking mean as expressed previously.

Furthermore as before, the above expression may be recursive in nature, where by the long term tracking variance $\sigma^2_m$ is updated every k samples according to the expression for $\sigma_{m+k}^2$. Therefore, after k samples the updated value of the variance may be given by $\sigma_{m+k}^2$. Before the next iteration update the value of $\sigma^2_m$ may be set to the current value of the previously updated long term tracking variance $\sigma_{m+k}^2$. As before, the accumulated number of audio samples m in the above expression may also be updated to reflect the last update of k samples. This may take the form of adding the k samples to the running total of samples m. The process therefore may be repeated for the subsequent k samples.

Calculation of the variance for a current frame of k samples and updating the long term tracking variance are shown as steps 509 and 511 in FIG. 5.

Normalisation of the audio signal may be periodically updated every k samples according to the newly calculated mean $\mu_{m+k}$ and standard deviation $\sigma_{m+k}$. It is to be understood that the newly calculated standard deviation $\sigma_{m+k}$ may be found by taking the square root of the updated long term tracking variance $\sigma_{m+k}^2$.

Calculation of the standard deviation from the long term tracking variance is shown as processing step 513 in FIG. 5.

After a k sample update of the long term tracking mean and the long term tracking variance values, the normalisation of an audio sample at time t=i, $x_i$, may be expressed as $$y_i = \frac{x_i - \mu_{m+k}}{\sigma_{m+k}}$$

Normalising the audio signal according to the long term tracking mean value and standard deviation is shown as processing steps 507 and 515 in FIG. 5.

In some embodiments of the invention the step of normalisation of the audio samples by the updated long term tracking mean and variance may not be restricted to take place over the actual samples used in the update process. In these embodiments the normalisation step may be performed over audio samples which extend beyond the range of the k samples used in the updating process. For example, the process may normalise the current k samples as well as samples from past or future frames.

In the first embodiment of the invention a derived estimation of the shaping parameter $\hat{\alpha}$ may be determined by calculating the ratio of the expected value of the second moment of the normalised audio sample to the expected value of the first moment of the audio normalised sample. This may be formulated in terms of the previous derived expressions as:

$$\hat{l} = \frac{E(y^2)}{E(|y|)} = \frac{\sum_0^N \left(\frac{x_i-\mu_m}{\sigma_m}\right)^2}{\sum_0^N \left|\frac{x_i-\mu_m}{\sigma_m}\right|}$$

Where in the above expression N is the total number of audio samples over which the derived estimated shaping parameter $\hat{l}$ is calculated.

It is to be understood that estimated shaping parameter or the derived estimated shaping parameter may be used as a classification feature in any subsequent processing steps.

It is to be further understood that the above derived expression for the estimation of the shaping parameter has the desired technical effect of eliminating the need for computationally demanding numerical procedures.

In embodiments of the invention these audio sample values may be drawn from current and past audio frames. It is to be noted that the number of audio samples used to estimate the shaping parameter has an influence on the quality of the estimate. Typically, the quality of the estimated value is directly related to the size of the data set used. However, if the shaping parameter estimator draws its audio samples from both the current and future frames, a delay will be incurred due to the buffering of future samples. Therefore in the audio signal classification system there is a trade off to be made between the delay required to buffer future samples and the quality of the estimated value.

In one such embodiment of the invention, a buffering delay of 10 audio frames may be used in order to estimate the shaping factor. The amount of buffering delay may be found experimentally in order to balance performance of the audio signal classifier with the need to keep the delay to a minimum. For this particular example, the codec utilises a frame size of 20 ms or 320 samples at a sampling frequency of 16 kHz. It is to be also noted that in this particular example of an embodiment of the invention the number of audio samples k over which the variance and mean values are updated may be 320 samples, and the total number of samples N used to estimate the shaping parameter is 3200. Therefore in this example, audio samples from the current frame and nine buffered frames are normalised. However, it is to be understood that this example is in no way limiting, and it is possible to determine differing lengths of buffering delay for a different sampling frequency. For example, an audio sampling frequency of 32 kHz may results in a buffering delay of 6400 samples for an equivalent frame size.

In some embodiments of the invention, the mechanism for storing the sample values used for the estimation process may be implemented as a first in first out (FIFO) buffer. In a mechanism such as this the length of the FIFO buffer may be determined to be the same length as the number of samples required for the subsequent estimation process. Typically in a FIFO buffer arrangement the contents of the buffer may be updated on a frame by frame basis.

In further embodiments of the invention the sample delay may be implemented as a sliding window arrangement whereby the audio samples used in the estimation process are within the boundary of the window. The length of the window is equivalent to the delay required for the implementation of the shaping factor estimation process. Upon receipt of the next audio frame the time position of the window is updated to encompass the most recent audio frame.

Determination of the estimated shaping parameter (or derived estimated shaping parameter) is shown as processing step 515 in FIG. 5.

In further embodiments of the invention the generalised Gaussian distribution shape parameter may be estimated by calculating the Kurtosis value of the audio signal. The Kurtosis κ value may be estimated according to the following expression $$\kappa = \frac{\frac{1}{n}\sum_{i=1}^{n} x_i^4}{\left(\frac{1}{n}\sum_{i=1}^{n} x_i^2\right)^2}$$

where $x_i$ are samples of the audio signal, and n is the number of samples over which the Kurtosis value may be calculated. In some embodiments of the invention the number of samples n may typically be the length of an audio frame, or in further embodiments of the invention the number of samples may easily be the length corresponding to several frames of audio.

In these embodiments of the invention the Kurtosis value based estimate of the generalised Gaussian distribution shape parameter $\hat{\alpha}$ may be determined according to the following expression $$\hat{\alpha} = \frac{1.447}{\ln\kappa - 0.345}$$

The process of estimating the shaping parameter for a frame of audio samples is shown as step 1003 in FIG. 10.

The signal feature classifier 403 may receive the estimated shaping parameter (or derived estimated shaping parameter), which may otherwise be known as signal features, for the audio current frame from the signal feature estimator 401. The classifier may then use the estimated shaping parameters (or derived estimated shaping parameter) to classify the current frame of the audio signal.

In embodiments of the invention the classifier may be based on the maximum likelihood principle. In this type of classifier the audio signal may be classified according to the probability of an extracted feature that is estimated shaping parameter or equivalent exhibiting a particular statistical characteristic.

In order to implement a maximum likelihood type classifier it is desirable to train the classifier using a training data set specifically comprising numerous examples of the features the classifier intends to classify. Therefore, in embodiments of the invention the training data set may consist of a plurality of estimated shaping parameters (or derived estimated shaping parameters) as typically generated by the signal feature estimator 401.

In a first embodiment of the invention the signal feature estimator 401 and the signal feature classifier 403 may be used autonomously from the other elements of the audio signal classifier 260 in an off line mode of operation. Initially, the signal feature estimator 401 may operate on pre categorised regions of audio signal in order to produce a training set of estimated shaping factors (otherwise known as feature values) or equivalent thereof for a particular category (or statistical characteristic) of the audio signal. This processing step may be repeated for each intended category of audio signal.

The signal feature estimator 401 whilst operating in an off line mode may then generate a probability density function or histogram for each audio signal category using the respective set of pre categorised estimated shaping parameters. In embodiments of the invention the probability density function or histogram may be formed by calculating the relative occurrence of each classification feature shaping parameter value.

The process of generating probability density functions may be repeated for each potential category of audio signal.

The signal feature classifier 403 may be trained whilst operating in an off line mode by noting the dynamic range of the classification feature (i.e. the estimated shaping parameter or equivalents thereof) and dividing the signal feature classifier 403 range into a number of finite intervals, or quantisation levels. The mid point of each interval may then be assigned a value which reflects the probability of an estimated shaping parameter value (or equivalent thereof) falling within a particular interval for a particular category of audio signal. In some embodiments of the invention these probability assigned intervals may be termed interval estimates.

The mechanism of assigning probability values to interval mid points may be achieved by mapping each finite interval onto the so called x-axis of the histogram and calculating the area under the histogram corresponding to the position and length on the x-axis of the mapped finite interval. In some embodiments of the invention this process may take the form of assigning the relative occurrence of the estimated shaping parameter (or equivalent thereof) to the interval mid points.

It is to be understood that each interval may have a number or probability values assigned to it, where each value is associated with a probability density function for a different category (or region) of audio signal.

It is to be further understood that in a first embodiment of the invention that the estimated shaping factor interval values and their assigned probabilities are calculated off line and may be pre stored in the classifier.

During operation within an audio codec the feature estimator 401 and signal feature classifier 403 may be working in a so called on line mode of operation. In the online mode of operation the feature estimator 401 may generate an estimated shaping parameter or derived estimated shaping parameter for the current audio frame. This estimated shaping parameter or derived estimated shaping parameter may then be passed to the signal feature classifier 403 for classification.

The estimated shaping parameter or derived estimated shaping parameter for each audio frame, as determined by the signal feature estimator 401, may then be passed to the signal feature classifier 403 in order to assign a particular audio signal classification value to the parameter. The signal feature estimator 401 may therefore produces an audio signal classification for each input estimated shaping parameter or derived estimated shaping parameter.

In a first embodiment of the invention this may be done by mapping the estimated shaping parameter (or derived estimated shaping parameter) value to the nearest signal classifier interval estimate. The classification of the estimated shaping parameter (or derived estimated shaping parameter) may then be determined according to the relative values of the probabilities assigned to that classifier interval estimate. The estimated shaping parameter (or derived estimated shaping parameter) and therefore the current audio frame may be classified according to the audio signal category whose probability value is the greatest for the interval. In the first embodiment of the invention the audio signal category is portrayed by the audio signal classification value.

In an example of a first embodiment of the invention the audio signal may be categorised into two regions: music and speech. In this particular example, each feature interval estimate may have two probability values assigned to it: one probability value representing the likelihood of music, and the other probability value representing the likelihood of speech It is to be understood that further embodiments of the invention may categorise the audio signal into more than two regions. As a consequence of this, each feature interval region within the classifier may have more than two probability values assigned to it. Furthermore, in these embodiments the classifier may be trained using audio material which comprises more than two pre categorised types (or regions) of audio signal.

The process of determining the audio signal classification value for the estimated shaping parameter (or derived estimated shaping parameter) is shown as step 1005 in FIG. 10.

The output from the signal feature classifier 403, that is the audio signal classification, may then be connected to the input of the classification decision delay processor 405. The effect of the classification decision delay processor 405 is to produce a dampening effect on any audio signal classification change from one audio frame to the next. This may be used in order to prevent frequent switching of the audio signal classification. The output from this processing stage may form the audio signal classification decision for the current audio frame.

In a first embodiment of the invention the classification decision delay processor 405 may be arranged in the form of a first-in-first-out (FIFO) buffer. In which each FIFO buffer memory store contains a previous audio signal classification value, with the most recent values at the start of the buffer and the oldest values at the end of the buffer.

FIG. 8 depicts the operation of the classification decision delay processor 405 according to a first embodiment of the invention.

Initially the FIFO buffer memory stores may be initialised to a particular instance of the audio signal classification value.

The classification decision delay processor 405 may receive a new audio signal classification value on a frame by frame basis from the signal feature classifier 403.

The process of receiving the audio signal classification value is shown as processing step 701 in FIG. 8.

The newly received audio signal classification value may then be compared to each previous audio signal classification value stored in the FIFO buffer.

The process of comparing the newly received audio signal classification value with the contents of the FIFO buffer is shown as step 703 in FIG. 8.

A decision may be made upon the result of the FIFO buffer memory comparison step. If the newly received audio signal classification value is the same as each previous audio signal classification value stored in the FIFO buffer, then the output audio signal classification decision from the classification delay decision processor 405 may be set to be the value of the most recent received audio signal classification value. However, if the newly received audio signal classification value does not match with each previous audio signal classification value stored in the FIFO buffer, then the output audio signal classification decision from the classification delay decision processor 405 for the current audio frame will be set to being the same value as that of the previous frame's output audio signal classification decision, or the immediate proceeding audio signal classification decision.

The process of determining if the content of the FIFO buffer matches with the current frame audio signal classification value is shown as processing step 705 in FIG. 8.

The process of setting the audio signal classification decision according to the result of the comparison of the received audio signal classification value to the contents of the FIFO buffer is shown as processing steps 707 and 709 in FIG. 8.

Once the output classification decision has been made the FIFO buffer may be updated with the most recent audio signal classification value. This updating process may take the form of removing the oldest audio signal classification value from the end of the FIFO buffer store, and adding the most recent audio signal classification value to the beginning of the FIFO buffer store.

The process of updating the FIFO buffer with the current audio signal classification value is shown as processing step 711 in FIG. 8.

The store for the previous audio signal classification decision may then be updated with the audio signal classification decision value for the current audio frame.

The process of updating the previous audio signal classification decision is shown as processing step 713 in FIG. 8.

It is to be understood that in embodiments of the invention the classification delay decision processor 405 as described by the above outlined process has the technical effect of delaying the change of the audio signal classification, such that a change is only effectuated when the newly received audio signal classification value is a match to the contents of the FIFO buffer. By incorporating this delay, the dampening effect which ensues prevents rapid or oscillatory changes to the output classification decision.

It is to be further understood that the amount of delay before a change in output classification decision is effectuated may be dependent on the depth or the memory length of the FIFO buffer.

In an example of a first embodiment of the invention the depth of the FIFO buffer may consist of two previous audio signal classification values. The FIFO buffer depth may be determined experimentally in order to balance the delay of a system to react to a change in audio signal classification, with the need to remove oscillatory classification decisions.

The process of determining the audio signal classification decision for the audio frame is shown as processing step 1007 in FIG. 10.

The output of the classification delay decision processor 405 may be connected to the output of the audio signal classifier 260.

The output of the audio signal classifier 260 may be connected to an element which configures and controls the contents of the output bitstream from an audio codec.

In embodiments of the invention the configuration of the output bit stream 112 may take the form of determining which coding layers of an embedded layered coding scheme may be incorporated into the output bit stream 112. The criteria upon which this determination may be done may be dependent on the classification as portrayed by the audio signal classification decision.

In a first embodiment of the invention the audio signal classifier 260 may be used in conjunction with an embedded variable rate codec (EV-VBR) in order to determine a sub set of the set of embedded coding layers which may be distributed to an output bit stream 112. The contents of the sub set of embedded coding layers may be selected according to the output of the signal classifier 260.

It is to be understood that in further embodiments of the invention the sub set of embedded coding layers selected for distribution to the output bit stream 112 may be selected according to the classification of audio signal type. Where the decision value used to form the sub set of embedded coding layers may be generated from the audio signal classification output from any one of a number of differing audio signal classification technologies. For example, in some embodiments of the invention the audio signal classification may be generated from a Voice Activity Device (VAD) at type of signal classification algorithm more commonly associated with speech coding algorithms.

FIG. 3 depicts the audio signal classifier 260 according to the first embodiment of the invention whereby the audio signal classifier takes as input the difference signal as generated by the difference unit 213. That is the signal which is generated by taking the difference between the synthesised signal output from the core encoder 248 and the delayed input audio signal. The audio signal classifier 260 may then classify the difference signal as being originated from either a speech signal or a music signal. The output of the audio signal classifier 260 may be connected to the input of the multiplexer/bit stream formatter 256. The multiplexer/bit stream formatter 256 may contain processing logic which uses the value of the audio signal classification decision in order to determine the sub set of embedded coding layers which may be selected for distribution to the output bit stream 112.

Figure 9:
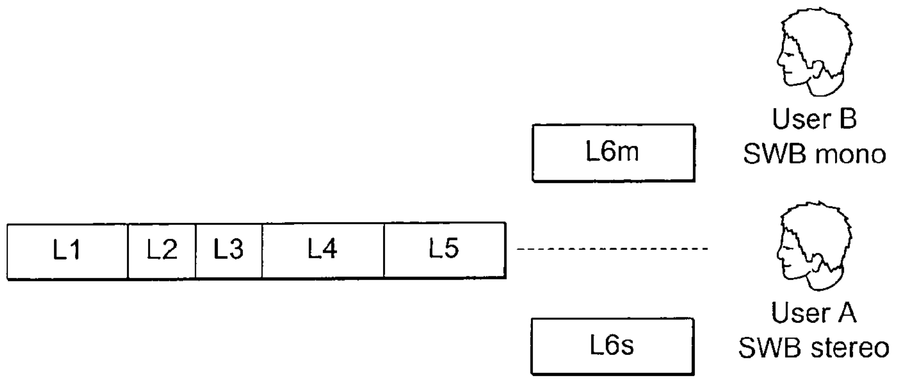
FIG. 9 shows an example of operation of an embodiment of the present invention.

In the first embodiment of the invention the sub set of embedded coding layers used to form the output bit stream 112 may be selected according to the joint criteria of operating mode of the codec and audio signal region type. For instance, FIG. 9 depicts a particular example of the application of the first embodiment of the invention. In this example A and B are users which each have an embedded variable codec capable of encoding and decoding EV-VBR baseline codec layers R1 to R5, and the extension layers L6*s* for stereo enhancement side information and L6*m* for super wideband expansion side information. The bandwidth of the communication channel is limited such that only one enhancement layer can be transmitted. In this particular example of a first embodiment of the invention, the audio signal classifier may be used in order to determine which enhancement layer should be transmitted across the communication channel. For example, if the audio signal exhibits music like characteristics as determined by the audio signal classifier 260 then it may be preferable to select the super wideband extension layer (L6*m*) for transmission by the bit stream formatter 256. Alternatively if the audio signal classifier 260 determines the audio signal to be speech like then the bit stream formatter may select the stereo enhancement layer (L6*s*) for transmission.

It is to be understood that in further examples of the first embodiment of the invention, a sub set of the set of embedded base line layers R1 to R5 may be selected according to the output of the audio signal classifier 260. Furthermore, in yet further examples of the first embodiment of the invention, the sub set of embedded coding layers dependent on the output from the audio signal classifier 260 may be drawn from the complete set of embedded coding layers for the EV-VBR codec comprising coding layers R1 to R5 and the extension layers L6*s* and L6*m*.

Further embodiments of the invention may arrange the audio signal classifier 260 as a front end signal processor to the audio codec. In this arrangement the audio signal classifier may first analyse and categorise the audio signal before any coding functionality is performed. The result of the audio signal classification process may then be used to determine the mode of operation of the subsequent audio coding steps. In these further embodiments of the invention the classifier may be incorporated as an integral part of the audio codec, or as a separate distinct functional block.

The embodiments of the invention described above describe the codec in terms of separate encoders 104 and decoders 108 apparatus in order to assist the understanding of the processes involved. However, it would be appreciated that the apparatus, structures and operations may be implemented as a single encoder-decoder apparatus/structure/operation. Furthermore in some embodiments of the invention the coder and decoder may share some/or all common elements.

Although the above examples describe embodiments of the invention operating within a codec within an electronic device 610, it would be appreciated that the invention as described below may be implemented as part of any variable rate/adaptive rate audio (or speech) codec. Thus, for example, embodiments of the invention may be implemented in an audio codec which may implement audio coding over fixed or wired communication paths.

Furthermore in some embodiments of the invention there may be a method for processing an audio signal comprising determining an audio signal classification decision, using the audio signal classification decision to select at least one coding layer from a set of coding layers of an embedded layered audio codec; and distributing coding parameters associated with the at least one coding layer to a bit stream.

In some embodiments of the invention the determination of the audio signal classification decision may be carried out using the method described in detail above. The audio signal classification decision may therefore, by determining a type of audio signal, more efficiently/accurately code the audio signal.

Thus user equipment may comprise an audio codec such as those described in embodiments of the invention above.

It shall be appreciated that the term user equipment is intended to cover any suitable type of wireless user equipment, such as mobile telephones, portable data processing devices or portable web browsers.

Furthermore elements of a public land mobile network (PLMN) may also comprise audio codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:

estimating at least one shaping parameter value of a generalized Gaussian random variable for a plurality of samples of the audio signal;

generating at least one audio signal classification value by mapping the at least one shaping parameter value to one of at least two probability values associated with each of at least two interval estimates;

comparing the at least one audio signal classification value to at least one previous audio signal classification value; and generating the at least one audio signal classification decision dependent at least in part on the result of the comparison.

2. The method as claimed in claim 1, wherein the at least one audio signal classification decision is updated to be the value of the at least one audio signal classification value if the result of the comparison indicates that the at least one audio signal classification value is the same as each of the at least one previous audio signal classification value and the at least one audio signal classification decision is not the same as an immediate proceeding audio signal classification decision.

3. The method as claimed in claim 1, wherein the at least one previous audio signal classification value is stored in a first in first out memory.

4. The method as claimed in claim 1, wherein each of the at least two probability values is associated with one of at least two distributions of pre-determined shaping parameter values, and wherein each of the at least two distributions of predetermined shaping parameter values is each associated with a different audio signal type.

5. The method as claimed in claim 1, wherein generating the at least one audio signal classification value further comprises:

mapping the estimated shaping parameter value to a closest interval estimate; and assigning the audio signal classification value a value representative of an audio signal type, wherein the value representative of the audio signal type is determined according to the greatest of the at least two probability values associated with the closest interval estimate.

6. The method for as claimed in claim 1, wherein mapping the shaping parameter value comprises:

determining the closest interval estimate to the at least one shaping parameter value, wherein each interval estimate further comprises a classification value;

generating the at least one audio signal classification value dependent on the closest interval estimate classification value.

7. The method as claimed in claim 1, wherein determining the closest interval estimate comprises:

selecting the interval estimate with a greatest probability value for the shaping parameter value.

8. The method as claimed in claim 1, wherein estimating the shaping parameter value comprises:

calculating the ratio of a second moment of a normalized audio signal to the first moment of a normalized audio signal.

9. The method as claimed in claim 8, wherein the normalized audio signal is formed by subtracting a mean value from the audio signal to form a resultant value and dividing the resultant value by a standard deviation value, wherein the calculation of the standard deviation at least comprises:

calculating a variance value for at least part of the audio signal;

updating a long term tracking variance with the variance value for the at least part of the audio signal; and wherein the calculation of the mean comprises;

calculation a mean value for at least part of the audio signal; and updating a long term tracking mean with the mean value for the at least part of the audio signal.

10. The method as claimed in claim 1, wherein the estimated shaping parameter value of the shaping parameter of a generalized Gaussian random variable is estimated using a method of estimation derived from a Mallat method of estimation.

11. The method as claimed in claim 1, wherein the estimated shaping parameter value of the shaping parameter of a generalized Gaussian random variable is estimated using a Mallat method of estimation.

12. The method as claimed in claim 1, wherein the estimated shaping parameter value of the shaping parameter of a generalized Gaussian random variable is estimated using a kurtosis value.

13. An apparatus comprising at least one processor and at least one memory including computer program code the at least one memory and the computer program code configured to, with the at least one processor, cause the apparatus at least to;

estimate at least one shaping parameter value of a generalized Gaussian random variable for a plurality of samples of the audio signal;

generate at least one audio signal classification value by mapping the at least one shaping parameter value to one of at least two probability values associated with each of at least two interval estimates; and compare the at least one audio signal classification value to at least one previous audio signal classification value; and generate the at least one audio signal classification decision dependent at least in part on the result of the comparison.

14. The apparatus as claimed in claim 13, wherein the at least one memory and the computer program code are further configured to, with the at least one processor, cause the apparatus to:

update the at least one audio signal classification decision to be the value of the at least one audio signal classification value if the result of the comparison indicates that the at least one audio signal classification value is the same as each of the at least one previous audio signal classification value and the at least one audio signal classification decision is not the same as an immediate proceeding audio signal classification decision.

15. The apparatus as claimed in claim 13, wherein the at least one memory and the computer program code are further configured to, with the at least one processor, cause the apparatus to:

store the at least one previous audio signal classification value is stored in a first in first out memory.

16. The apparatus as claimed in claim 13, wherein each of the at least two probability values is associated with one of at least two distributions of pre-determined shaping parameter values, and wherein each of the at least two distributions of predetermined shaping parameter values is each associated with a different audio signal type.

17. The apparatus as claimed in claim 13, wherein the at least one memory and the computer program code configured to, with the at least one processor, cause the apparatus to generate the at least one audio signal classification value is further configured to cause the apparatus to:

map the estimated shaping parameter value to a closest interval estimate; and assign the audio signal classification value a value representative of an audio signal type, wherein the value representative of the audio signal type is determined according to the greatest of the at least two probability values associated with the closest interval estimate.

18. The apparatus as claimed in claim 13, wherein the at least one memory and the computer program code configured to map the shaping parameter value, with the at least one processor, is further configured to cause the apparatus to:

determine the closest interval estimate to the at least one shaping parameter value, wherein each interval estimate further comprises a classification value;

generate the at least one audio signal classification value dependent on the closest interval estimate classification value.

19. The apparatus as claimed in claim 13, wherein the at least one memory and the computer program code configured to determine the closest interval estimate, with the at least one processor, is further configured to cause the apparatus to:

select the interval estimate with a greatest probability value for the shaping parameter value.

20. The apparatus as claimed in claim 13, wherein the at least one memory and the computer program code configured to estimate the shaping parameter, with the at least one processor, is further configured to cause the apparatus to:

calculate the ratio of a second moment of a normalized audio signal to the first moment of a normalized audio signal.

21. The apparatus as claimed in claim 20, wherein the at least one memory and the computer program code are further configured to, with the at least one processor, cause the apparatus to:

form the normalized audio signal by subtracting a mean value from the audio signal to form a resultant value and dividing the resultant value by a standard deviation value, wherein the apparatus is configured to calculate of the standard deviation by calculating a variance value for at least part of the audio signal and updating a long term tracking variance with the variance value for the at least part of the audio signal, and wherein the apparatus is configured to calculate the mean by calculating a mean value for at least part of the audio signal and updating a long term tracking mean with the mean value for the at least part of the audio signal.

22. The apparatus as claimed in claim 13, further configured to estimate the estimated shaping parameter of the shaping parameter of a generalized Gaussian random variable using a method of estimation derived from a Mallat method of estimation.

23. The apparatus as claimed in claim 13, further configured to estimate the estimated shaping parameter of the shaping parameter of a generalized Gaussian random variable using a Mallat method of estimation.

24. The apparatus as claimed in claim 13, further configured to estimate the estimated shaping parameter of the shaping parameter of a generalized Gaussian random variable using a kurtosis value.

* * * * *